United States Patent
Rhodes et al.

(10) Patent No.: US 7,145,326 B2
(45) Date of Patent: Dec. 5, 2006

(54) SYSTEMS AND METHODS FOR POSITION DETECTION

(75) Inventors: Michael L. Rhodes, Richfield, MN (US); Philip J. Zumsteg, Shorewood, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/749,268

(22) Filed: Dec. 31, 2003

(65) Prior Publication Data

US 2005/0140362 A1    Jun. 30, 2005

(51) Int. Cl.
*G01R 33/09* (2006.01)
(52) U.S. Cl. .............. 324/207.21; 324/207.23
(58) Field of Classification Search ..............
324/207.13–207.16, 207.2, 207.21, 207.22–207.26, 324/239, 242–243, 244–252
See application file for complete search history.

(56) References Cited

U.S. PATENT DOCUMENTS

| 5,589,769 A | 12/1996 | Krahn |
| 6,097,183 A | 8/2000 | Goetz et al. |
| 6,360,773 B1 | 3/2002 | Rhodes |
| 6,509,732 B1 | 1/2003 | Rhodes et al. |
| 6,674,280 B1 | 1/2004 | Goetz et al. |
| 2004/0027119 A1* | 2/2004 | Rosenheimer et al. ...... 324/244 |

* cited by examiner

*Primary Examiner*—Bot LeDynh

(57) ABSTRACT

A method and system to detect a position of a member movable along a defined path is described. The system includes a magnetic source, an array of sensors, and an analyzer. The magnetic source radiates a magnetic field and is coupled to a movable member. The array of sensors is fixed relative to the movable member. Each sensor generates an output response value based on an angle of the magnetic field passing through each sensor. The array of sensors produces a plurality of output response values for a first position of the movable member. The analyzer receives the plurality of output response values and calculates a composite output response value to determine the first position of the movable member.

17 Claims, 6 Drawing Sheets

SYSTEMS AND METHODS FOR POSITION DETECTION

FIELD

The present invention relates generally to position detection systems or apparatus and particularly to apparatus for determining the position of a member that is movable along a defined path of finite length.

BACKGROUND

It is a common problem to want to know the position of a device whose position is being controlled by an actuator or some other means. For example, in the controls industry, devices such as valves having a valve stem or valve shaft which is movable by an actuator are used to control the flow of liquids and gasses associated with industrial processes of various types. In these applications it is common to want to know, at any given time, the precise position of the movable valve stem or valve shaft. This information allows improved understanding of the process and the control of the process.

A number of prior solutions have been proposed. Linear variable differential transformers (lvdt) can provide accurate position information. However they require a mechanical linkage and also generally use relatively high power. Potentiometers or other rotary transducers require a mechanical linkage and also have the disadvantage of a sliding electrical contact which can cause long term reliability issues. Optical coding schemes make use of a coded element with opaque and transparent sections to provide digital data inputs to an array of sensors positioned to measure the light passing through the sections. While optical coding devices do not require a mechanical linkage, the optical approach only works well in very clean environments and is therefore not applied in many industrial environments.

These conventional contact-based position sensing methods require a direct mechanical linkage or translation of the moving component to a transducer, from which the physical position is then derived. Such systems suffer from at least two primary shortcomings. One is that mechanical linkages are prone to wear, causing the reported position to be unpredictable and inaccurate. Another is that mechanical translation of the components movement path to a transducer introduces position reporting errors due to uncorrectable non-linearities in the transformation. Previous approaches have addressed this problem for the specialized case of linear motion; however, rotary (circular) motion and motion that defines an arbitrary path that is neither linear nor circular is also needed in the position sensing field.

Thus a need exists for a reliable position determining apparatus that does not require a mechanical linkage between the apparatus and the movable member, is relatively insensitive to environmental factors, and robust enough to be applicable to non-linear motion.

SUMMARY

Generally, the present invention pertains to a system, apparatus and method for sensing symmetrical, asymmetrical arc and arbitrary path positions of an object. It may use an array of sensors positioned in an arc or in a two-dimensional array to sense the location of a small magnet. The magnet is not in physical contact with the sensor array. Each sensor in the array may sense the angle of the magnetic field lines passing through it. The invention may be the combination of sensor position (known a priori) and the magnetic field. This combination may provide for calculation of the magnetic position to high accuracy. The sensor outputs may be multiplexed through a series of analog amplifiers and an analog-to-digital converter (ADC) to a microprocessor for position calculation. The microprocessor may also provide for background compensation.

In one illustrative embodiment, a system to detect a position of a member movable along a defined path is described. The system includes a magnetic source, an array of sensors, and an analyzer. The magnetic source radiates a magnetic field and is coupled to a movable member. The array of sensors is fixed relative to the movable member. Each sensor generates an output response value based on an angle of the magnetic field passing through each sensor. The array of sensors produces a plurality of output response values for a first position of the movable member. The analyzer receives the plurality of output response values and calculates a composite output response value to determine the first position of the movable member.

In another illustrative embodiment, a method for determining a position of a member movable along a defined path is described. The method include the step of providing a means for radiating a magnetic field coupled to a movable means movable along a defined path. The next step is to provide an array of sensor means fixed relative to the movable means. Each sensor means generates an output response value based on an angle of the field passing through each sensor means. The array of sensors means produce a plurality of output response values for a first position of the movable means. The next step is to calculate a composite output response value from the plurality of output response values. The final step is determining the first position of the movable means from the calculated composite output response value.

The above summary of the present invention is not intended to describe each disclosed embodiment or every implementation of the present invention. The Figures, Detailed Description and Examples which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
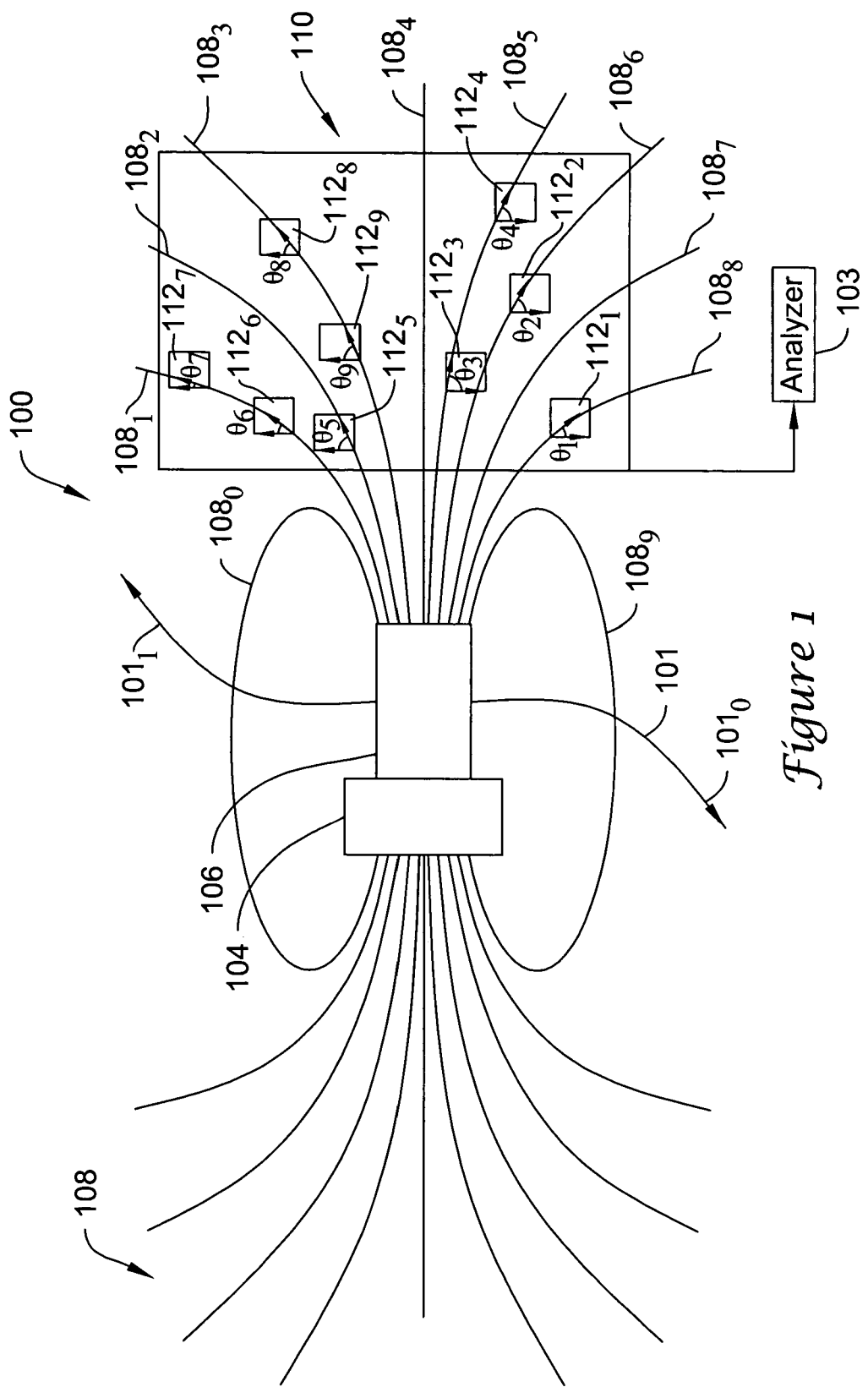
FIG. 1 is a system diagram according to an aspect of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

In the following detailed description of exemplary embodiments of the invention, reference is made to the accompanying drawings that form a part hereof, and in which is shown, by way of illustration, specific exemplary embodiments in which the invention may be practiced. These embodiments are described in sufficient detail to enable those skilled in the art to practice the invention. Other embodiments may be utilized and structural, logical, electrical, and other changes may be made without departing from the spirit or scope of the present invention. The following detailed description is, therefore, not to be taken in a limiting sense, and the scope of the present invention is defined only by the appended claims.

Generally, the present invention pertains to a system, apparatus and method for sensing symmetrical, asymmetrical arc and arbitrary path positions of an object. In an illustrative embodiment, it may use an array of sensors positioned in an arc or in a two-dimensional array to sense the location of a small magnet. The magnet may not be in physical contact with the sensor array. Each sensor in the array may sense the angle of the magnetic field lines passing through it. The invention may be the combination of sensor position (known a priori) and the magnetic field. This combination may provide for calculation of the magnetic position to high accuracy. The sensor outputs may be multiplexed through a series of analog amplifiers and an analog-to-digital converter (ADC) to a microprocessor for position calculation. The microprocessor may also provide for background compensation.

FIG. 1 is a system diagram 100 according to an aspect of the invention. In the illustrative embodiment, a magnetic source 106 is disposed on or coupled to a movable member 104. The magnetic source 106 radiates a magnetic field 108. The magnetic field is shown as a plurality of magnetic flux lines $108_0$, $108_1$, $108_2$, $108_3$, $108_4$, $108_5$, $108_6$, $108_7$, $108_8$, and $108_9$, forming a magnetic field about the magnetic source 106. The movable member 104 is movable along a defined path 101 in a first direction $101_0$ and an opposite second direction $101_1$. The defined path 101 can be a symmetrical or asymmetrical path. The defined path 101 can be a linear or non-linear path. The defined path can be a curved path such as for example, a circular path or portion of a circular path or arc. The defined path 101 is shown in FIG. 1 as an arcuate path; however the defined path 101 can have any arbitrary trajectory. In the illustrative embodiment, the magnetic source is a magnet having poles that are orientated perpendicular to the defined path 101. In another illustrative embodiment, the magnetic source is a magnet having poles that are orientated parallel to the defined path 101. In another illustrative embodiment, the magnetic source is a magnet having poles that are orientated at an angle to the defined path 101 that is neither parallel nor perpendicular to the defined path 101.

The plurality of magnetic flux lines can be detected be an array of sensors 110. The array of sensors 110 can be fixed relative to the moving member 104. In the illustrative embodiment, the array of sensors 110 is not in physical contact with the magnetic source 106 and includes nine sensors $112_1$, $112_2$, $112_3$, $112_4$, $112_5$, $112_6$, $112_7$, $112_8$, and $112_9$, however any useful number of sensors can be utilized. In one embodiment, at least two sensors are used. In another embodiment, at least three sensors are used. In yet another embodiment, at least four sensors are used. In a further embodiment, at least seven sensors are used.

Each sensor $112_{1-9}$ can generate an output response value based on the angle that the magnetic flux line strikes and/or passes through each sensor. This incidence angle is shown as $\theta_{1-9}$. The sensors $112_{1-9}$ can include magneto-resistive material such as, for example, permalloy strips and operating in a magnetic field strong enough to saturate the permalloy strips. Under saturated conditions, the resistance change of the permalloy strips is a measure of the angle of the magnetic field relative to the sensor $112_{1-9}$.

The array of sensors 110 can be defined by a uniform or non-uniform two dimensional pattern of individual sensors $112_{1-9}$. The array of sensors 110 can be defined by a linear or non-linear array of individual sensors $112_{1-9}$. In an illustrative embodiment, the array of sensors 110 can be defined by a curved array of individual sensors $112_{1-9}$. Each sensor $112_{1-9}$ provides an output response value for each position of the magnetic source 106 along the defined path 101. At each position along the defined path 101 the sensors $112_{1-9}$ define a unique combination of output response values. This unique combination of output response values can be received by a processor 103 and the processor 103 can calculate the position of the magnetic source 106 based on the unique combination of output response values. This calculated composite output response value can be compared to a path reference curve to determine the position of the magnetic source. The path reference curve can be created by mapping the calculated composite output response value at a plurality of positions along the defined path 101 versus the defined path position. This unique combination of sensor position (known as prioir) and magnetic field geometry allows calculation of the magnet source 106 position along the defined path 101 with high accuracy.

Figure 2:
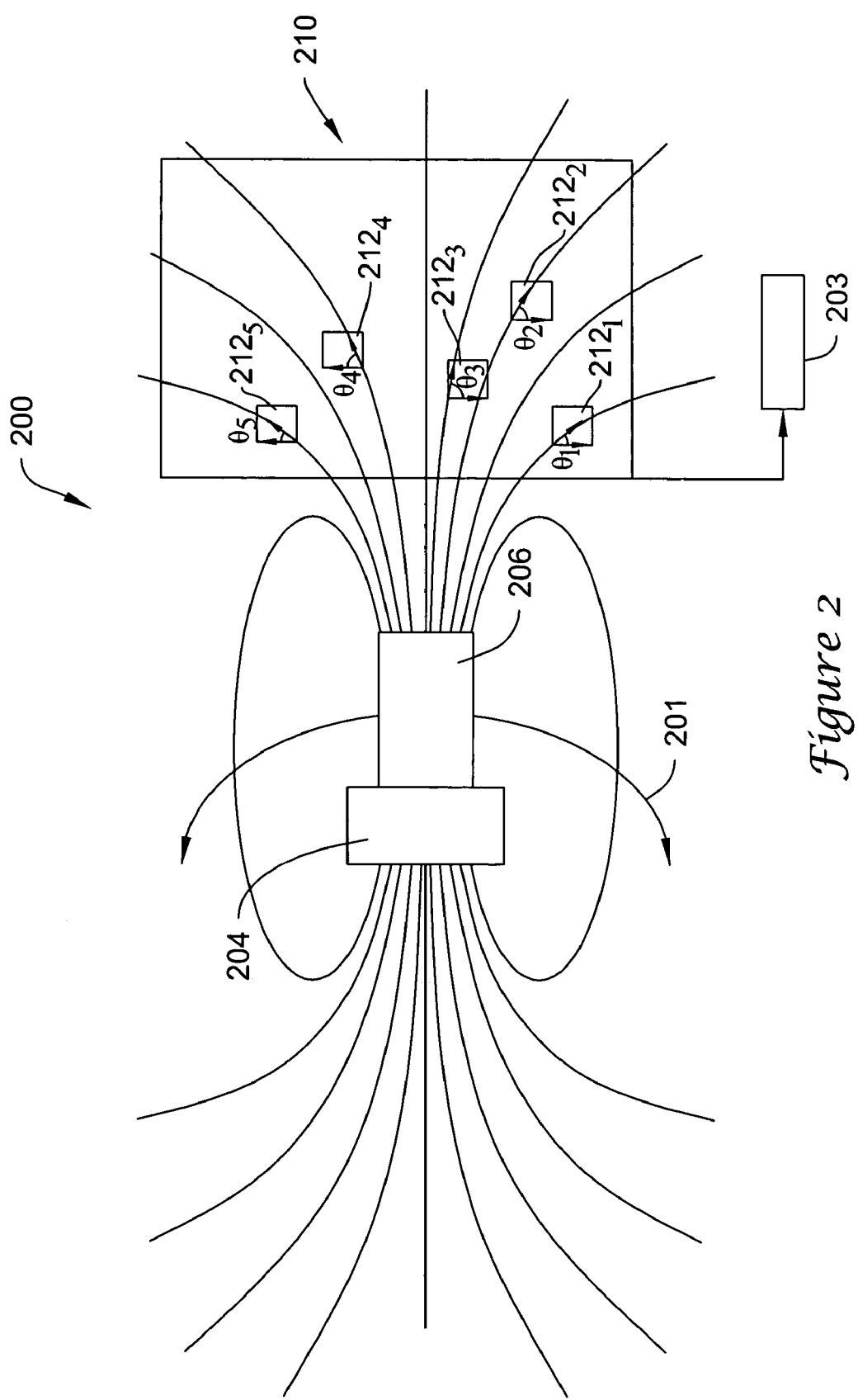
FIG. 2 is another system diagram according to an aspect of the invention.

FIG. 2 is another system diagram 200 according to an aspect of the invention. In the illustrative embodiment, a magnetic source 206 is disposed on or coupled to a movable member 204. The magnetic source 206 radiates a magnetic field 208. The magnetic field is shown as a plurality of magnetic flux lines $208_0$, $208_1$, $208_2$, $208_3$, $208_4$, $208_5$, $208_6$, $208_7$, $208_8$, and $208_9$, forming a magnetic field about the magnetic source 206. The movable member 204 is movable along a defined path 201. The defined path 201 is shown as at least a portion of a circular path or arc.

The plurality of magnetic flux lines $208_{0-9}$ can be detected be an array of five sensors 210. The array of sensors 210 can be fixed relative to the moving member 204. In the illustrative embodiment, the array of sensors 210 is not in physical contact with the magnetic source 206 and includes five sensors $212_1$, $212_2$, $212_3$, $212_4$, and $212_5$.

Each sensor $212_{1-5}$ can generate an output response value based on the angle that the magnetic flux line strikes and/or passes through each sensor. This incidence angle is shown as above, $\theta_{1-5}$. The sensors $212_{1-5}$ can include magneto-resistive material such as, for example, permalloy strips and operating in a magnetic field strong enough to saturate the permalloy strips. Under saturated conditions, the resistance change of the permalloy strips is a measure of the angle of the magnetic field relative to the sensor $212_{1-5}$.

The array of sensors 210 can be defined by a non-uniform two dimensional pattern of individual sensors $212_{1-5}$. Each sensor $212_{1-5}$ provides an output response value for each position of the magnetic source 206 along the defined path 201. At each position along the defined path 201 the sensors $212_{1-5}$ define a unique combination of output response values. This unique combination of output response values can be received by a processor 203 and the processor 203 can calculate the position of the magnetic source 206 based on the unique combination of output response values. This calculated composite output response value can be compared to a path reference curve to determine the position of the magnetic source.

Figure 3:
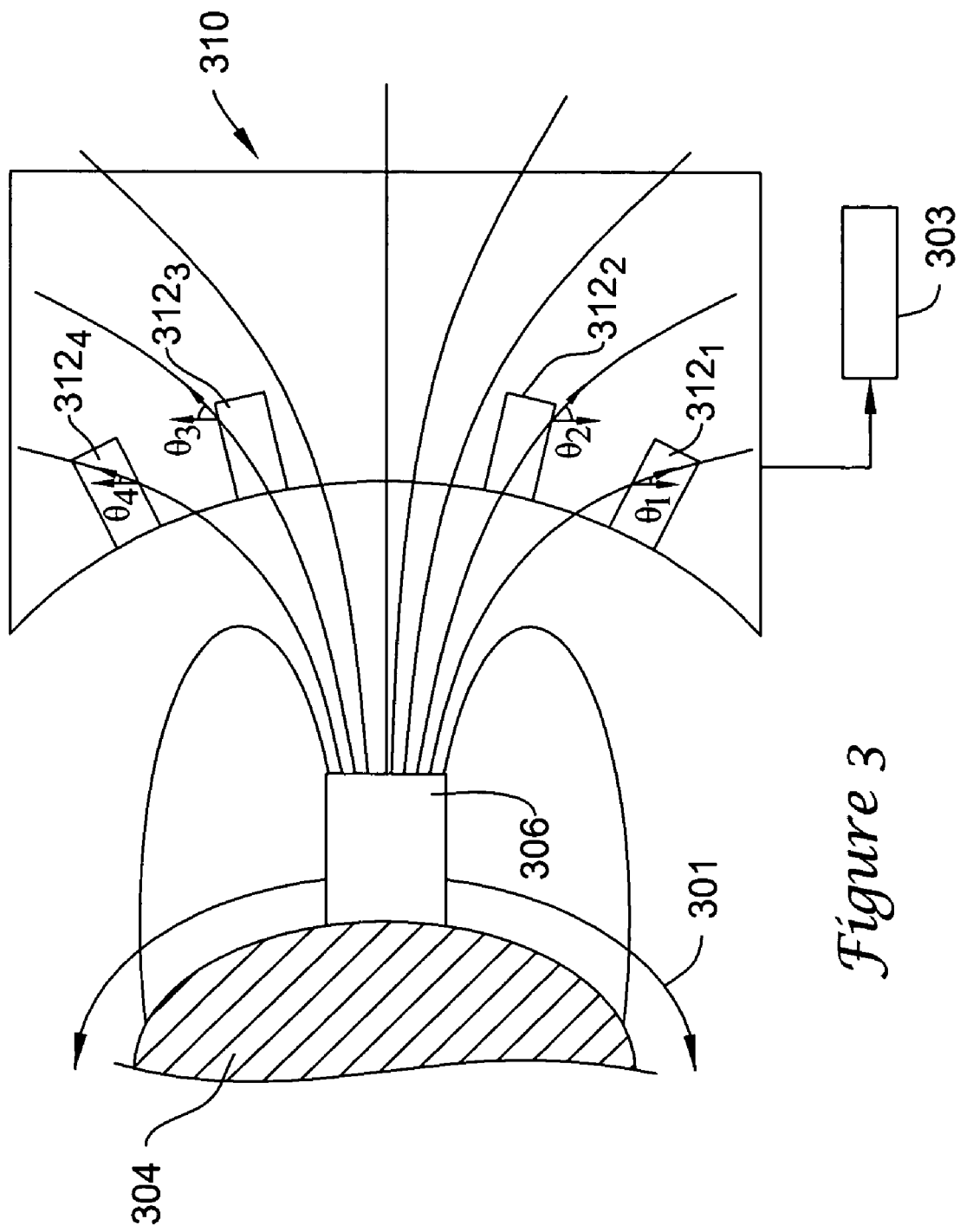
FIG. 3 is another system diagram according to an aspect of the invention.

FIG. 3 is another system diagram 300 according to an aspect of the invention. In the illustrative embodiment, a magnetic source 306 is disposed on or coupled to a movable member 304. The movable member 304 can be an actuator valve stem or other control device member. The magnetic source 306 radiates a magnetic field 308. The magnetic field is shown as a plurality of magnetic flux lines $308_0$, $308_1$, $308_2$, $308_3$, $308_4$, $308_5$, $308_6$, $308_7$, $308_8$, and $308_9$, forming a magnetic field about the magnetic source 306. The movable member 304 is movable along a defined path 301. The defined path 301 is shown as at least a portion of a circular path or arc.

The plurality of magnetic flux lines $308_{0-9}$ can be detected be an array of four sensors 310. The array of sensors 310 can be fixed relative to the moving member 304. In the illustrative embodiment, the array of sensors 310 is not in physical contact with the magnetic source 306 and includes four sensors $312_1$, $312_2$, $312_3$, and $312_4$.

Each sensor $312_{1-4}$ can generate an output response value based on the angle that the magnetic flux line strikes and/or passes through each sensor. This incidence angle is shown as above, $\theta_{1-4}$. The sensors $312_{1-4}$ can include magneto-resistive material such as, for example, permalloy strips and operating in a magnetic field strong enough to saturate the permalloy strips. Under saturated conditions, the resistance change of the permalloy strips is a measure of the angle of the magnetic field relative to the sensor $312_{1-4}$.

The array of sensors 310 can be defined by a uniform two dimensional pattern of individual sensors $312_{1-3}$, as shown forming an arc. Each sensor $312_{1-4}$ provides an output response value for each position of the magnetic source 306 along the defined path 301. At each position along the defined path 301 the sensors $312_{1-4}$ define a unique combination of output response values. This unique combination of output response values can be received by a processor 303 and the processor 303 can calculate the position of the magnetic source 306 based on the unique combination of output response values. This calculated composite output response value can be compared to a path reference curve to determine the position of the magnetic source.

Figure 4:
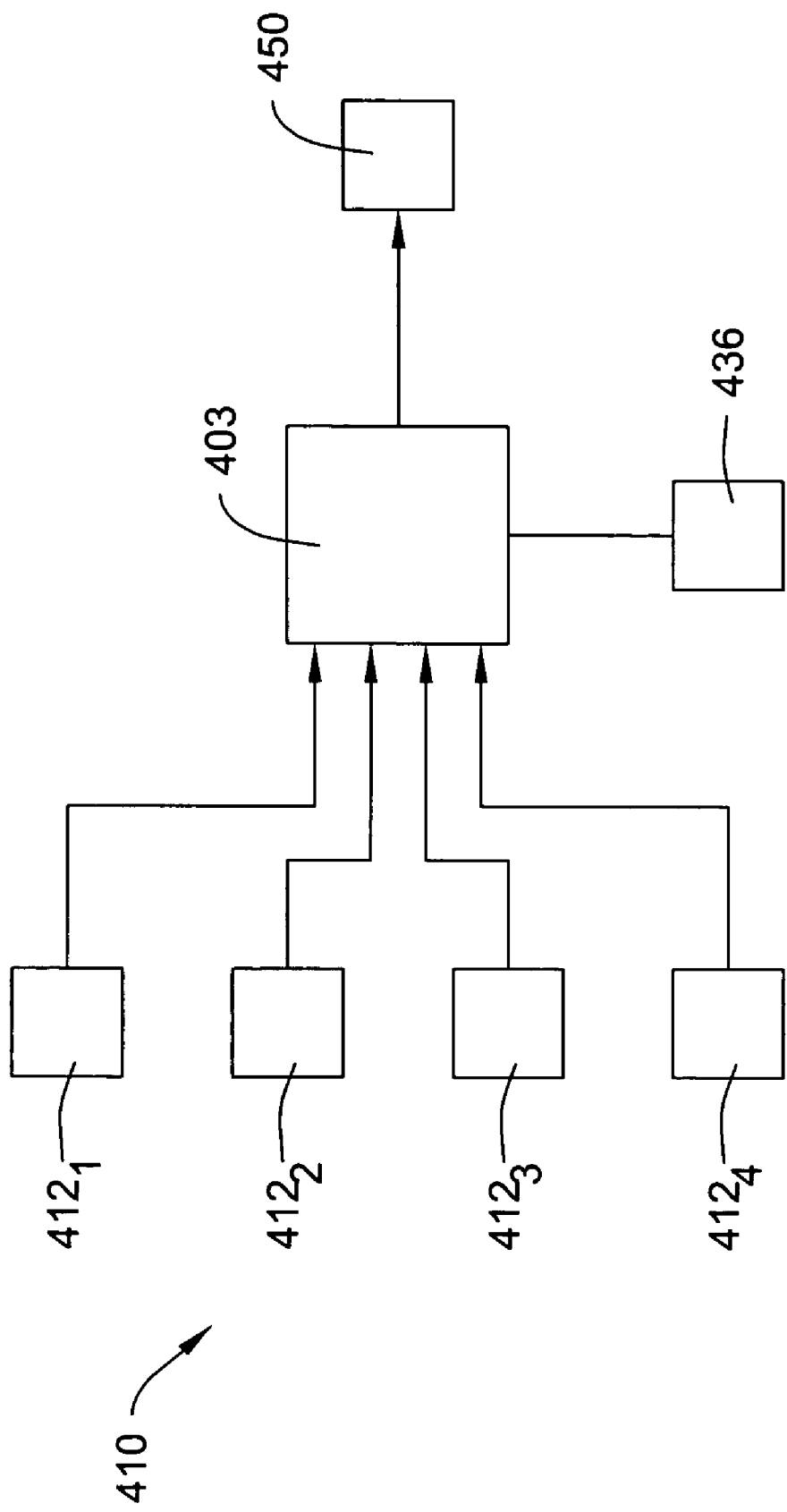
FIG. 4 is a schematic block diagram of an illustrative embodiment of the invention.

FIG. 4 is a schematic block diagram of an illustrative embodiment of the invention. Sensors $412_1$, $412_2$, $412_3$, and $412_4$ forming the sensor array 410 are connected to a processor 403. The processor 403 can calculate a composite output response value based on the unique combination of output response values generated by the sensors for each position of the magnetic source and determine the calculated position 450 of the magnetic source as described above.

To minimize power consumption, sensors $412_1$, $412_2$, $412_3$, and $412_4$ may be wired to an analog-to-digital converter (A/D), that is connected to a microprocessor 403 and its associated memory 436. Microprocessor 436 can be a lower-power and lower performance processor such as a Motorola 68HCO5 or a Microchip PIC16C71, which is suitably programmed to calculate a composite output response value and provide background compensation as well, and provide a signal or count indicative of the position of the magnet along the predefined path. An algorithm can be embedded in microprocessor 436 for this purpose.

Figure 5:
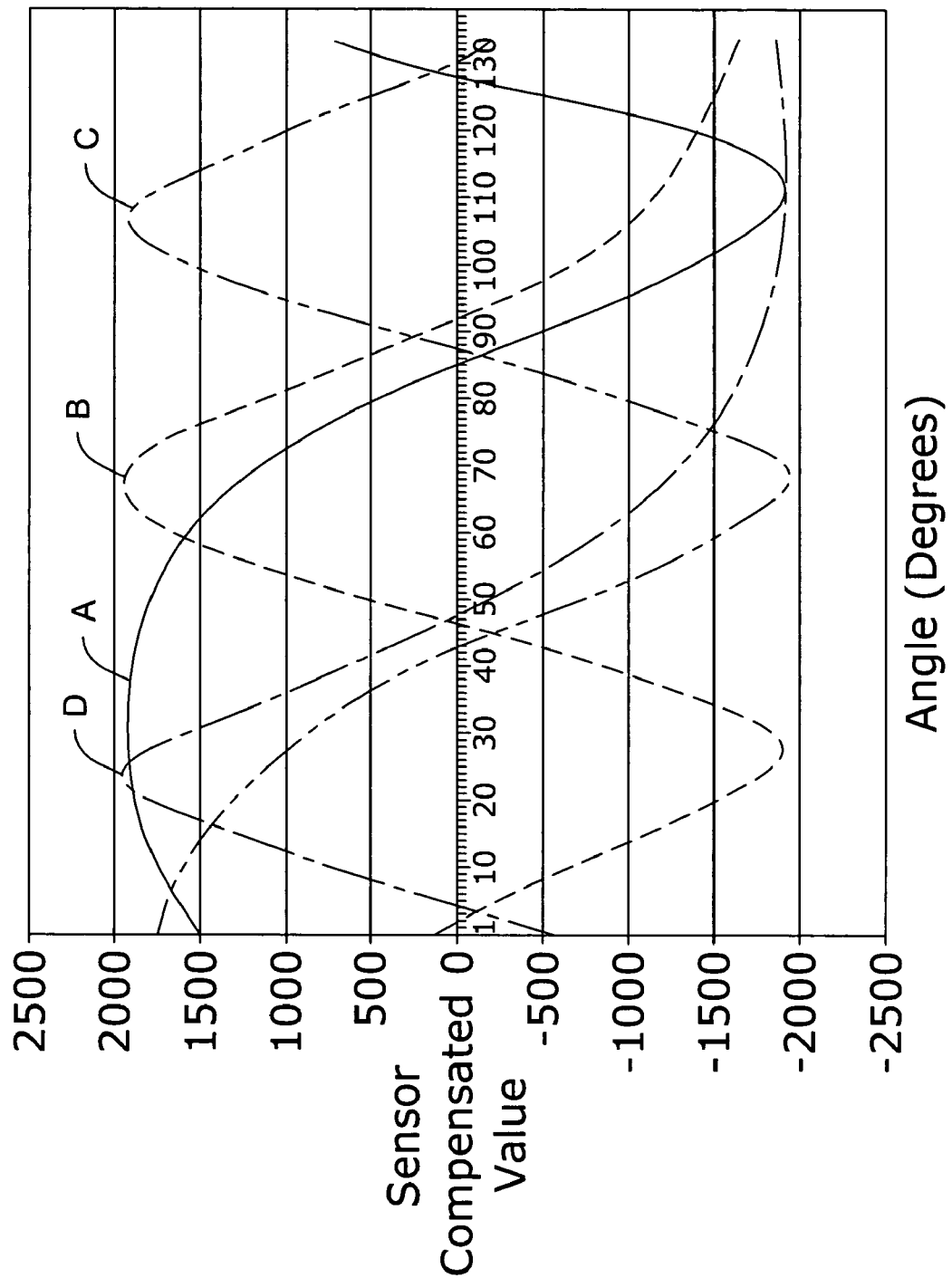
FIG. 5 is a graph of sensor response values from the system of FIG. 3 as a magnetic source is moved about 120 degrees about a circular path.
Figure 6:
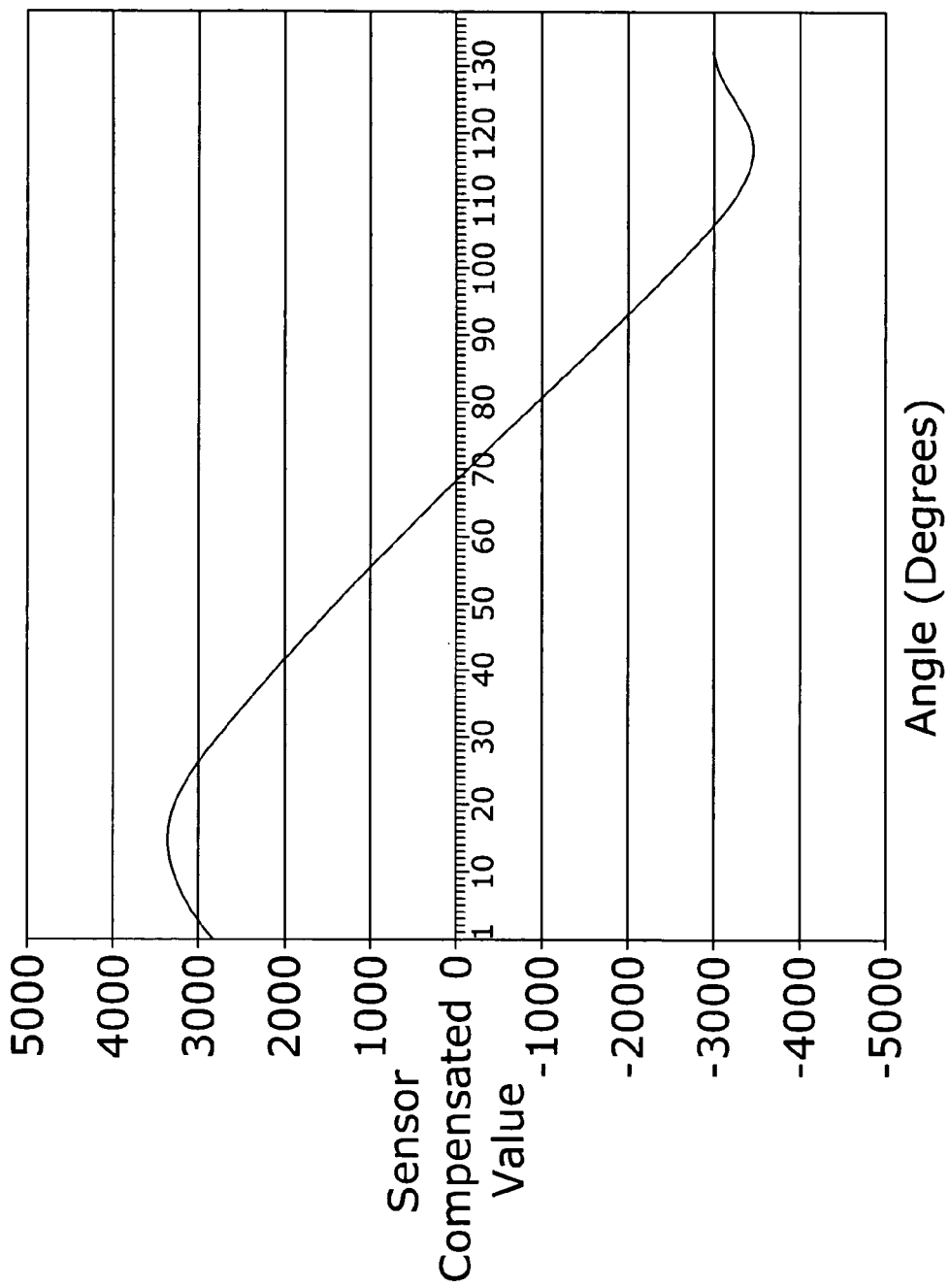
FIG. 6 is a graph of a composite output response values calculated from the graph of FIG. 5.

FIG. 5 is a graph of sensor response values (Sensor A, Sensor B, Sensor C and Sensor D) from the system of FIG. 3 as a magnetic source is moved about 120 degrees about a circular path. FIG. 6 is a graph of a composite output response values calculated from the graph of FIG. 5. In this example, the composite output response values were calculated by adding the sensor response values together. The composite output response value can be calculated by any suitable calculation method that takes each sensor response value into account such as for example, multiplication, or higher order function.

The present invention should not be considered limited to the particular examples described above, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

What is claimed is:

1. A system to detect a position of a member movable along a defined path comprising:
   a magnetic source radiating a magnetic field coupled to a movable member;
   a array of sensors comprising magneto-resistive sensors, each sensor generates an output response value based on an angle of the magnetic field passing through each sensor, the array of sensors producing a plurality of output response values for a first position of the movable member; and
   an analyzer for receiving the plurality of output response values and calculating a composite output response value to determine the first position of the movable member.

2. The system according to claim 1, wherein the movable member moves along a defined non-linear path.

3. The system according to claim 1, wherein the movable member moves along a defined curved path.

4. The system according to claim 1, wherein the movable member moves along a defined circular path.

5. The system according to claim 1, wherein the array of sensors define a non-linear array of sensors.

6. The system according to claim 1, wherein the array of sensors define a curved array of sensors.

7. The system according to claim 1, wherein the array of sensors comprise an array of 4 sensors.

8. The system according to claim 1, wherein the ray of sensors comprise an array of 7 sensors.

9. A method for determining a position of a member movable along a defined path, comprising the following steps:
   providing a magnetic source radiating a magnetic field coupled to a movable member movable along a defined non-linear path;
   providing an array of sensors, each sensor generating an output response value based on an angle of the field passing through each sensor, the array of sensors producing a plurality of output response values for a first position of the movable member;
   calculating a composite output response value from the plurality of output response values; and
   determining the first position of the movable member from the calculated composite output response value.

10. The method according to claim 9, further comprising the step of determining a path reference curve based on the composite output response value for a plurality of positions of the movable member along the defined path.

11. The method according to claim 10, wherein the determining the first position of the movable member step comprises determining the first position of the movable member by comparing the calculated composite output response value to the path reference curve.

12. The method according to claim 9, wherein the providing a magnetic source step comprises providing a magnetic source radiating a magnetic field coupled to a movable member movable along a curved path.

13. The method according to claim 9, wherein the providing a magnetic source step comprises providing a magnetic source radiating a magnetic field coupled to a movable member movable along a circular path.

14. A system to detect a position of a member movable along a defined path comprising:
   a radiating means for radiating a magnetic field coupled to a movable means for moving along a defined non-linear path;
   a array of sensor means for sensing a magnetic field angle, each sensor means generates an output response value based on an angle of the magnetic field passing through each sensor means, the array of sensor means producing a plurality of output response values for a first position of the movable means; and
   an analyzer means for receiving the plurality of output response values and calculating a composite output response value to determine the first position of the movable means.

15. A method for determining a position of a member movable along a defined path, comprising the following steps:
   providing a radiating means for radiating a magnetic field coupled to a movable means for moving along a defined non-linear path;
   providing an array of sensor means for sensing a magnetic field angle, each sensor means generating an output response value based on an angle of the field passing through each sensor means, the array of sensors means producing a plurality of output response values for a first position of the movable means;
   calculating a composite output response value from the plurality of output response values; and
   determining the first position of the movable means from the calculated composite output response value.

16. The method according to claim 15, further comprising the step of determining a path reference means for position reference based on the composite output response value for a plurality of positions of the movable means along the defined path.

17. The method according to claim 15, wherein to determining the first position of the movable means step comprises determining the first position of the movable means by comparing the calculated composite output response value to the path reference curve.

* * * * *